(12) United States Patent
Pantzar

(10) Patent No.: US 7,549,358 B2
(45) Date of Patent: Jun. 23, 2009

(54) CUTTING TOOL AND PARTS THEREFOR, AS WELL AS A METHOD FOR THE MANUFACTURE OF SUCH A CUTTING TOOL

(75) Inventor: Göran Pantzar, Arsunda (SE)

(73) Assignee: Sandvik Intellectual Property Aktiebolag, Sandviken (SE)

( * ) Notice: Subject to any disclaimer, the term of this patent is extended or adjusted under 35 U.S.C. 154(b) by 0 days.

(21) Appl. No.: 11/014,954

(22) Filed: Dec. 20, 2004

(65) Prior Publication Data

US 2005/0158132 A1 Jul. 21, 2005

(30) Foreign Application Priority Data

Dec. 23, 2003 (SE) .................................. 0303518

(51) Int. Cl.
*B23B 27/16* (2006.01)
*B23B 1/00* (2006.01)

(52) U.S. Cl. .............................. 82/1.11; 407/40; 407/66; 407/113; 82/1.4

(58) Field of Classification Search ......... 407/113–117, 407/40, 66, 67, 48, 53, 103, 33, 34, 64; 82/1.11, 82/1.4
See application file for complete search history.

(56) References Cited

U.S. PATENT DOCUMENTS

| 5,800,079 | A | | 9/1998 | Qvarth |
| 5,810,518 | A | * | 9/1998 | Wiman et al. ............... 407/102 |
| 6,004,080 | A | | 12/1999 | Qvarth et al. |
| 6,086,290 | A | | 7/2000 | Qvarth et al. |
| 6,102,630 | A | | 8/2000 | Flolo |
| 6,146,060 | A | | 11/2000 | Rydberg et al. |
| 6,565,297 | B2 | * | 5/2003 | Schmitt ........................ 409/66 |
| 6,921,234 | B2 | * | 7/2005 | Arvidsson et al. ........... 407/103 |
| 2003/0082021 | A1 | | 5/2003 | Minshall |
| 2003/0210961 | A1 | | 11/2003 | Arvidsson |
| 2004/0101371 | A1 | | 5/2004 | Arvidsson et al. |

FOREIGN PATENT DOCUMENTS

| AU | 213 925 | 12/1957 |
| SE | 9702500-1 | 12/1998 |
| WO | 97/16276 | 5/1997 |
| WO | 99/19104 | 4/1999 |
| WO | WO 99/19105 | 4/1999 |
| WO | 02/055243 | 7/2002 |
| WO | 03/080280 | 10/2003 |

\* cited by examiner

*Primary Examiner*—Willmon Fridie
(74) *Attorney, Agent, or Firm*—Drinker Biddle & Reath LLP

(57) ABSTRACT

A cutting tool includes first and second parts interconnected by respective connecting surfaces. Each connecting surface includes a serrated connecting surface having alternating ridges and grooves. Each groove is formed by two flanks of respective adjacent ridges and has a cross-sectional shape which becomes narrower toward a bottom of the groove. At least one of the groove flanks of the first part includes a plurality of contact surfaces spaced apart by a clearance surface, wherein a ridge of the second part is in contact with the contact surfaces and is out of contact with the clearance surface. The contact surfaces could be spaced apart along a length of the groove flank and/or along a height of the groove flank.

19 Claims, 5 Drawing Sheets

CUTTING TOOL AND PARTS THEREFOR, AS WELL AS A METHOD FOR THE MANUFACTURE OF SUCH A CUTTING TOOL

The present application claims the benefit of priority under 35 U.S.C. § 119 to Patent Application Serial No. 0303518-5 filed in Sweden on Dec. 23, 2003.

TECHNICAL FIELD OF THE INVENTION

In a first aspect, this invention relates to a cutting tool intended for chip removing machining of the type that comprises two parts, which are interconnectable via serration connecting surfaces that separately includes a set of cross-section-wise generally V-shaped ridges, which are spaced apart by grooves delimited by inclined flank surfaces on the ridges.

BACKGROUND OF THE INVENTION

Tools of the above generally mentioned kind are usually used for the machining of workpieces of metal, such as steel, aluminum, titanium, etc. The tools may either be fixedly mounted, e.g., for turning purposes, or be rotatable, e.g., for milling or drilling purposes. The parts included in the tools, which are interconnected via the serration connecting surfaces, usually consist of a basic body (at times a shim plate) and one or more cutting inserts. The cutting insert constitutes an article of consumption having a considerably shorter service life than the basic body serving as holder, and is, therefore, releasably connected to the basic body in order to enable exchange. Depending on the field of application, the cutting insert may have a most varying shape. Usually occurring embodiments consist of flat, polygonal or round cutting inserts of the type that has a top side, a bottom side and at least one side or circumferential surface extending between the same, which serves as a clearance surface, one or more cutting edges being formed in the transition between the top side and the clearance surface. Other cutting bodies may consist of rotatable so-called loose tops or cutting heads of the type that has a rotationally symmetrical envelope surface on which cutting edges are formed. Such cutting bodies are found, for instance, in drills, end milling cutters and the like.

It has always been an aim to connect the cutting insert or the cutting body to the basic body in an as rigidly and reliably way as possible. Previously, the conventional, flat cutting inserts were without exception formed with a smooth bottom side, the cutting inserts being mounted in seatings or so-called insert seats having a planar bottom against which the bottom side of the cutting insert was pressed, as well as one or more side support surfaces, against which the side surfaces of the cutting inserts were pressed. However, recently the use of co-operating serration connecting surfaces of the type initially mentioned has begun to be adopted in the tool industry.

PRIOR ART

In the patent literature, different embodiments of serration connecting surfaces are fairly richly disclosed. See for instance U.S. Pat. No. 6,102,630, WO 99/19104 (corresponding U.S. Pat. No. 6,004,080), WO 99/19105 (corresponding to U.S. Pat. No. 6,086,290) WO 97/16276 (corresponding U.S. Pat. No. 5,800,079), SE-9702500-1 (corresponding U.S. Pat. No. 6,146,060), AU-213,925, U.S. Pat. No. 5,810,518, WO 02/055243 (U.S. Publication 2004/0101371) and WO 03/080280 (U.S. Publication 2003/0210961). Common to the serration connections known from the these documents is that the ridges are equally high and the grooves are equally deep, wherein the crests on all ridges are located in a common first plane, which is parallel with a second plane, in which the bottoms of all grooves are located along the entire longitudinal extension thereof. Also, the ridges are equally wide and the grooves are equally wide so that that the flank surfaces or flanks of the ridges on both sides of a groove (regardless if they are planar or partly curved), extend parallel with each other along the entire length of the groove. This means in practice that cooperating ridges, which are wedged against each other when the tool parts are connected, exhibit surface or line contact along the entire longitudinal extension of the ridges or the flanks.

In theory, the flanks on the ridges in each connecting surface are ideally planar or straight along the entire longitudinal extension thereof and positioned at exact angles and positions in relation to each other and to the cooperating ridges in a connection interface. In practical manufacture of the basic bodies and cutting inserts, respectively, of the tools (something that occurs at different places) small shape defects and dimensional deviations may, however, arise, which entail that the contact places or surfaces between the flanks of the ridges are established in an uncontrolled and unsatisfactory way, when the connecting surfaces are brought to engagement with each other upon the mounting of the cutting insert in the insert seat on the basic body. In this connection, it may occur that actual flank contact arises in an irregular and unforeseeable way in the connection interface, e.g., by the fact that one of the flanks or both the flanks on one or more of the ridges, which are included in the cutting insert, attain partial contact solely with the top parts of the flanks on the surrounding ridges that are included in the connecting surface of the insert seat. This may result, among other things, in the interface between the cutting insert and the insert seat simply being sheared off by the fact that the material in the crest portions of the ridges of the insert seat deforms. Furthermore, at times angular displacements arise, so that nearby flanks may obtain different angles, whereby gaps arise between the same. Also partition errors may be present. The consequences of uncontrolled and mediocre contact between the ridges in an interface may become dangerous when the tool operates at high rotational speeds. For instance, a screw arranged for clamping of the cutting insert may be exposed to considerable tension load and be extended as a consequence of the ridges in the respective connecting surfaces moving in relation to each other; something that may lead to the screw breaking and the cutting insert coming loose from the basic body. It may also happen that the ridges in the usually hard material in the cutting insert crack.

OBJECTS AND FEATURES OF THE INVENTION

In a first aspect, the present invention aims at obviating the above-mentioned disadvantages of prior art and at providing an improved cutting tool. Therefore, a primary object of the invention is to provide a cutting tool having a connection interface, which has improved precision, more precisely by minimizing the risk that minor manufacturing defects result in an imprecise location of the cutting insert in the insert seat. In other words, the serration connecting surfaces should enable a stable and geometrically well-defined fixation of the cutting insert in the insert seat. An additional object is to provide a tool having a connection interface that enables the manufacture of comparatively thin cutting inserts without these running considerable risk of cracking or splitting up during use. Yet an object of the invention is to provide a cutting tool, the cutting inserts of which may be fixed in an exact way without the connecting surfaces necessarily needing to be ground.

According to the invention, at least the primary object is attained by a cutting tool which comprises first and second parts interconnected by respective connecting surfaces. Each connecting surface comprises a serrated connecting surface having alternating ridges and grooves. Each groove is formed by two flanks of respective adjacent ridges and has a cross sectional shape becoming narrower toward a bottom of the groove. At least one of the groove flanks of the first part includes a plurality of contact surfaces spaced apart by a clearance surface. A ridge of the second part is in contact with the contact surfaces and is out of contact with the clearance surface.

Preferably, the contact surfaces are spaced apart along a length of the groove, and each clearance surface is recessed relative to the contact surfaces in a direction away from an opposite flank of the groove.

Moreover, each contact surface may include contact surface portions which are spaced apart along a height of the flank.

The invention also pertains to an insert seat adapted to receive a cutting insert. The seat, which could be formed integrally with a holder, or on a shim plate mounted on a holder, comprises a serrated connecting surface having alternating ridges and grooves. Each groove is formed by two flanks of respective adjacent ridges and has a cross-sectional shape becoming narrower toward a bottom of the groove. At least one of the groove flanks includes a plurality of contact surfaces spaced apart by a clearance surface.

The invention further pertains to a cutting insert which comprises a serrated connecting surface having alternating ridges and grooves. Each groove is formed by two flanks of respective adjacent ridges and has a cross-sectional shape becoming narrower toward a bottom of the groove. At least one of the groove flanks includes a plurality of contact surfaces spaced apart by a clearance surface.

Yet another aspect of the invention pertains to a method for forming, in a workpiece, a serrated surface comprised of alternating ridges and grooves. Each groove is formed by two flanks of respective adjacent ridges and has a generally V-shaped cross-sectional shape which becomes narrower toward a bottom of the groove. The method comprises:

A. advancing a generally V-shaped cutting tool through the workpiece at a first height for a first distance of advancement, B. displacing the cutting tool deeper into the workpiece for a second distance of advancement, and C. returning the cutting tool to the first height for a third distance of advancement;

wherein a section of at least one of the flanks formed during advancement of the workpiece along the second distance is recessed with respect to the sections of such flank formed during advancement of the workpiece along the first and second distances, wherein the recessing is in a direction away from the opposite groove flank.

BRIEF DESCRIPTION OF THE DRAWINGS

The objects and advantages of the invention will become apparent from the following detailed description of a preferred embodiment thereof in connection with the accompanying drawing in which like numerals designate like elements, and in which.

DETAILED DESCRIPTION OF PREFERRED EMBODIMENTS

Figure 1:
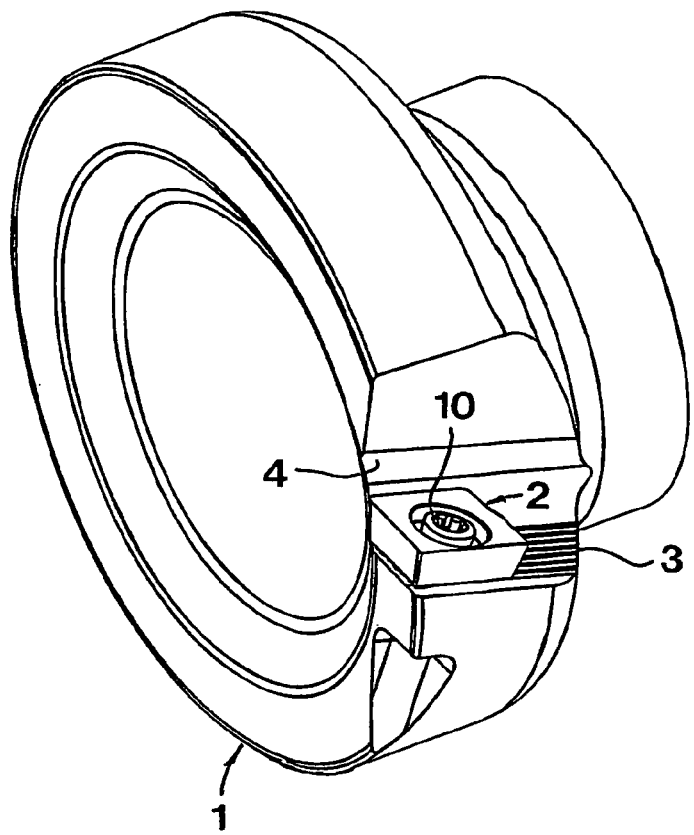
FIG. 1 is a simplified perspective view of a cutting tool in the form of a milling cutter.
Figure 2:
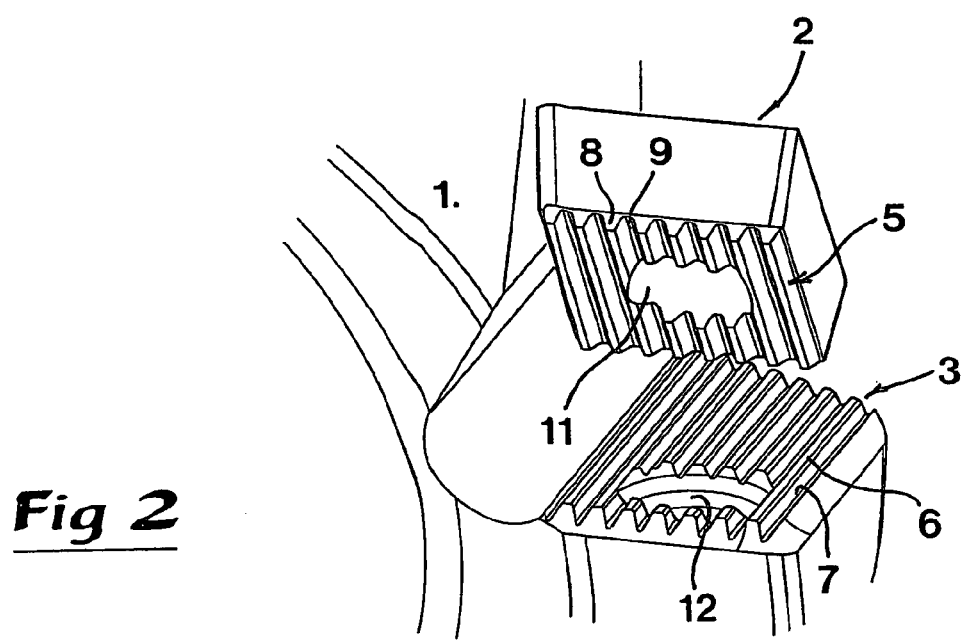
FIG. 2 is an enlarged, perspective exploded view showing a cutting insert spaced apart from an insert seat included in the basic body of the tool of FIG. 1

In FIG. 1, a rotatable cutting tool is shown embodied as a milling cutter, which includes a part in the form of a basic body 1, e.g., a cutter head, as well as a part in the form of a cutting insert 2. For the sake of simplicity, only one such cutting insert is shown, although milling cutters in practice are typically equipped with a plurality of peripheral, spaced apart cutting inserts. The individual cutting insert 2 is mounted in an insert seat designated 3, which is formed adjacent to a chip pocket 4 in the periphery of the basic body. The insert seat 3 which instead of being integral with the basic body or holder 1 could instead be disposed on a shim that is mounted on the basic body, comprises a first serrated connecting surface. This connecting surface is arranged to cooperate (mesh) with a second serrated connecting surface 5, which is formed on the bottom side of the cutting insert 2. Each one of the connecting surfaces 3, 5 comprises a set of cross-section-wise generally V-shaped ridges, which are spaced apart by grooves. In FIG. 2, the ridges of the connecting surface 3 are designated 6, while intermediate grooves or scores are designated 7. The ridges of the connecting surface 5 are designated 8, and intermediate grooves being designated 9. In the example shown, the cutting insert is fixed by means of a screw 10, which is mounted in a through hole 11 in the cutting insert and is tightened in a hole 12 formed with a female thread, which hole ports in the connecting surface 3.

Figure 3:
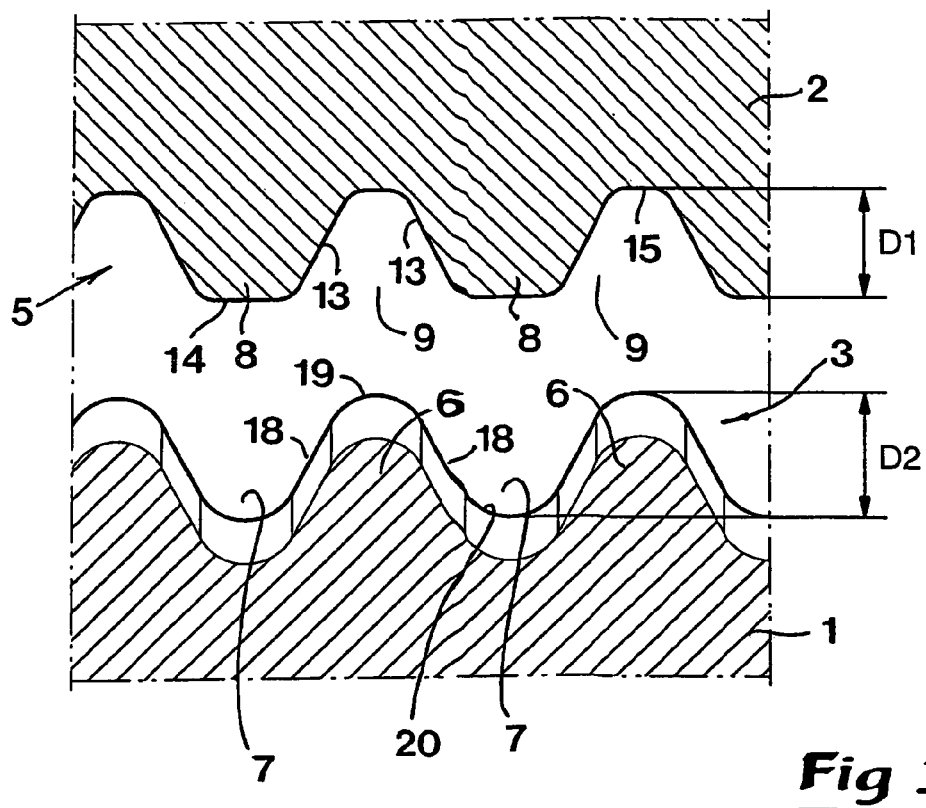
FIG. 3 is an additionally enlarged cross section showing two cooperating serration connecting surfaces included in the cutting insert and the insert seat, respectively.

In FIG. 3 it is seen how each individual groove 9 in the connecting surface 5 is delimited by two opposite flank surfaces or flanks 13 on the two adjacent ridges 8. A crest on the individual ridge is designated 14, while the bottoms of the grooves are designated 15. The angle between the flanks 13 may vary, per se, but in practice the angle usually amounts to about 60°.

In previously known connection interfaces, the grooves have been formed with flank surfaces, which are planar along the entire length of the groove with the purpose of providing surface contact between the entire length of the ridges. An exception to that technique is disclosed in the above-mentioned WO02/055243, which relates to a serration connection, in which the flanks of the ridges are formed with curved, string-shaped portions, which extend axially along the flanks, with the purpose of providing a well-defined line contact between cooperating ridges. However, also in that case, the cross-section-wise curved string portions extend along the entire length of the appurtenant ridge.

Figure 4:
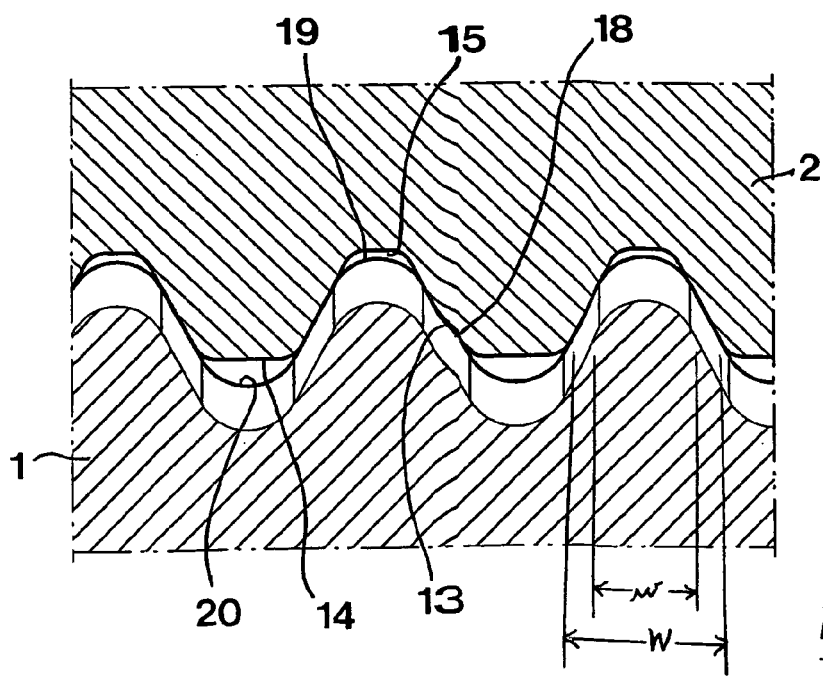
FIG. 4 is a cross-section showing the interface between the cutting insert and the basic body in the connected state thereof.

Characteristic of the present invention is that at least one of the two flank surfaces, which mutually define a groove, is formed with two or more contact supporting surfaces spaced apart along the length of the flank surface (i.e., the contact supporting surfaces are axially spaced), as well as clearance surfaces between the same. Thus, in FIGS. 3-8, it is illustrated how the connecting surface 3, which forms the insert seat of the basic body, is formed with a plurality of generally straight ridges 6, which are spaced apart by intermediate grooves 7. Each individual ridge 6 has two opposite flanks or flank surfaces 18. Although also the ridges and the grooves in the connecting surface 3, like the ridges 8 and the grooves 9, could be cross-section-wise trapezoidal, the crests 19 of the ridges 6 as well as the bottoms 20 of the grooves are made with curved shape. More precisely, the crests 19 are convexly curved and the bottom surfaces 20 concavely curved. As is seen in FIG. 4, the depths D1 and D2, respectively, of the ridges and of the grooves are so adapted in relation to each other and to the angles of the flanks that the ridges do not bottom-out in the appurtenant grooves, when the connecting surfaces are brought to engagement with each other (see FIG. 4).

Reference is now made to FIGS. 5-8, in which it is seen that the connecting surface 3 serving as an insert seat includes a plurality of axially spaced apart sections C and D, respectively, in which the ridges 6 and the grooves 7 are formed in various ways. More precisely, the flank surfaces designated 18a in each one of the sections C are planar and parallel along the entire longitudinal extension of the individual section C. This means that, in each Section C, the crests 19a of the ridges will be straight and located in a plane E (see FIG. 8), which is common to all crests 19a in the individual section C. Also, the groove bottoms 20a will be straight and located in a plane F common to all bottoms 20a, and which plane F is parallel with the plane E, although countersunk in relation to the plane E. In practice, the connecting surface 3 may be formed by milling by means of a milling cutter 21 which finishes a previously formed serrated surface (e.g., roughed-out by machining). When said milling cutter runs through the individual section C, the cutter moves in a plane parallel with the plane E of the crests 19a, as is outlined by the arrow G in FIG. 5. However, when the milling cutter 21 traverses the individual section D, the cutter is caused to move in a slightly concavely arched path, as is outlined by the arrow H. In such a way, not only the bottom surfaces 20b of the grooves, but also the flank surfaces 18b of the ridges in each section D, will be countersunk in relation to the corresponding surfaces 20a, 18a in each section C.

The milling cutter includes a number of rings 22 spaced axially apart to form grooves 23. Each ring has a V-shaped section, i.e., the sides 22a of each ring diverge from one another away from a crest 22b of the ring. That means that as the cutter moves downwardly to cut a section D after cutting a section C, the width w of the ridge along section D becomes gradually reduced as compared to the width W thereof along section C, as can be seen in FIG. 4. This means that the flank surfaces 18b in each section D form clearance surfaces, while the flank surfaces 18a in each section C form contact supporting surfaces (contact surfaces). In other words, in the example, the straight and planar flank surfaces 13 of the ridges 8 in the connecting surface 5 of the cutting insert 2 will be in contact with the flank surfaces 18a, but not with the clearance surfaces 18b, due to the varying width of the ridge which causes the clearance surfaces 18b to be recessed with respect to the contact surfaces, the recessing being in a direction away from the opposite flank of the respective groove.

Figure 5:
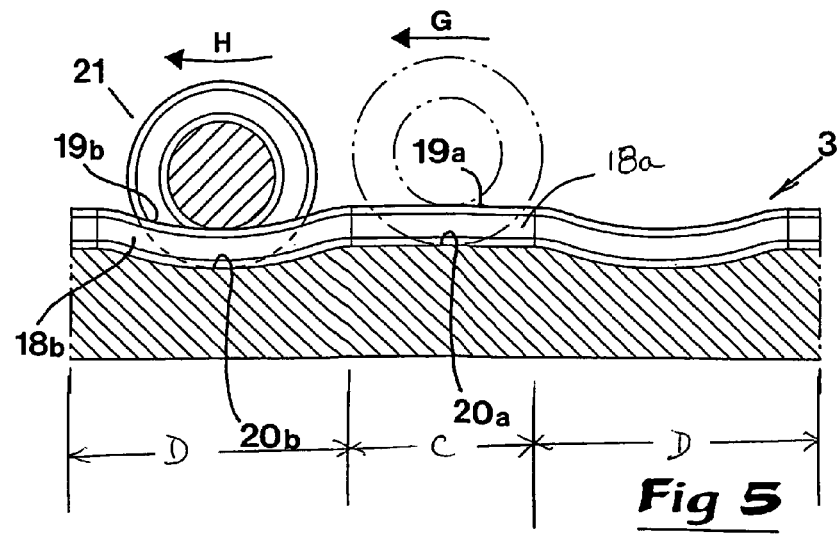
FIG. 5 is an enlarged longitudinal section through the serration connecting surface of the insert seat.
Figure 6:
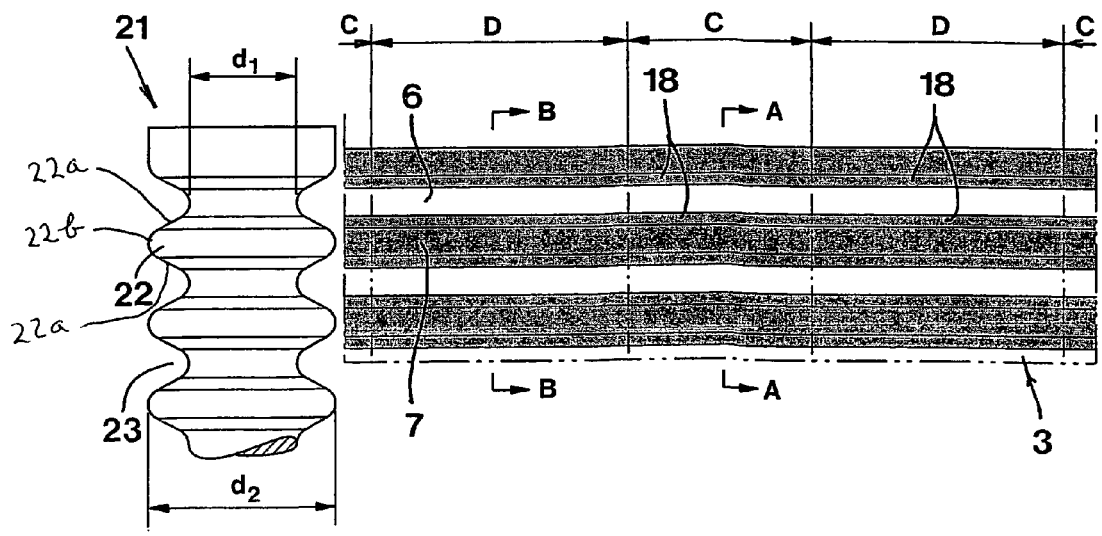
FIG. 6 is a partial planar view from above of the same serration connecting surface together with a schematically shown milling cutter for machining of the surface thereof.
Figure 7:
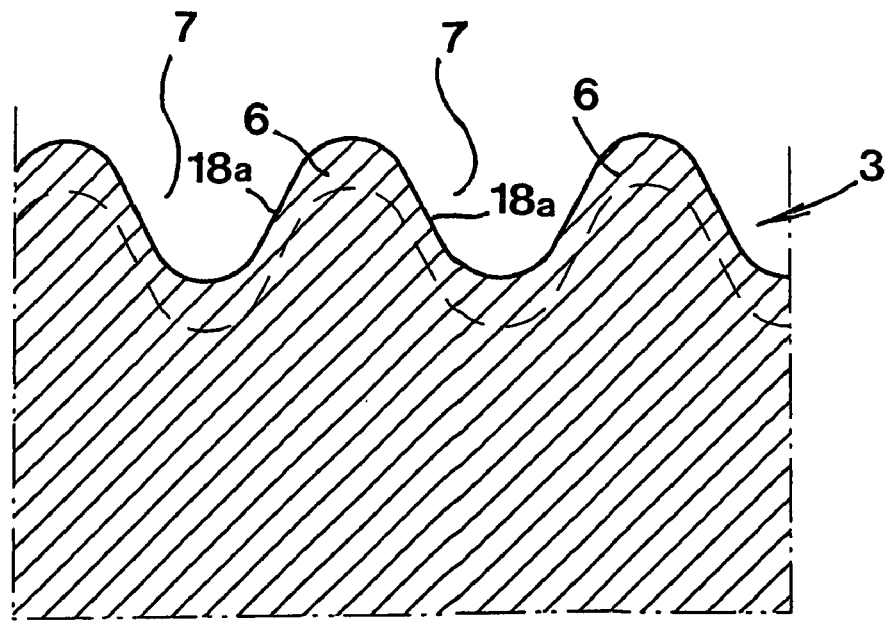
FIG. 7 is an enlarged cross-section taken along line A-A in FIG. 6.

The milling cutter 21 shown in FIGS. 5 and 6 includes a number of rings or cams 22, which form the grooves 7, as well as a number of intermediate waists 23. The cams 22 have an outer diameter of $d_1$, while the inner diameter of the waists 23 amounts to $d_2$. In the example shown, the radius difference $(d_2/2-d_1/2)$ of the milling cutter corresponds to the depth of the grooves. This means that not only the bottoms 20b of the grooves in the individual section D become arched, but also the crests 19b of the ridges (see FIG. 5). However, in this connection it should be pointed out that it is feasible to reduce the diameter of the waists 23 so that the waists do not contact the crests of the previously formed ridges of a roughed-out serrated surface. In such a way, the crests 19a, 19b of the ridges may be located in one and the same plane E along the sections C as well as the sections D, in spite of countersunk clearance surfaces 18b being formed in the sections.

Figure 8:
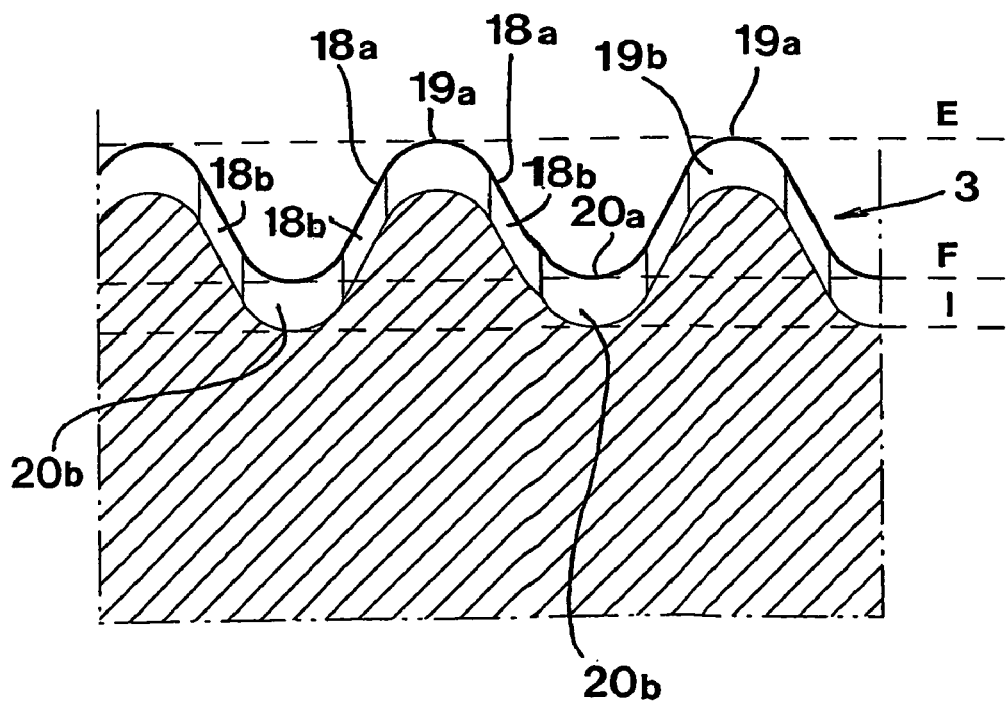
FIG. 8 is a cross-section taken along line B-B in FIG. 6.

As is seen in FIG. 8, the deepest located points of the bottom surfaces 20b (approximately halfway between the opposite ends of the individual section D) are located in a common plane 1, which is parallel with the planes E and F. According to a preferred embodiment of the invention, the clearance surfaces 18b may have greater longitudinal extension than the individual contact supporting surface 18a. This is seen in FIGS. 5 and 6, in which it is shown how the length of each of the sections D in the axial extension of the ridges is 30 to 40% greater than the length of each of the individual sections C.

As a minimum, the individual connecting surface includes two spaced apart sections C, the ridges of which have flat and coplanar contact supporting surfaces 18a, as well as at least one intermediate section D, comprising ridges having clearance surfaces 18b. However, in practice, a plurality of axially spaced apart clearance surfaces may be formed along the ridges.

Figure 9:
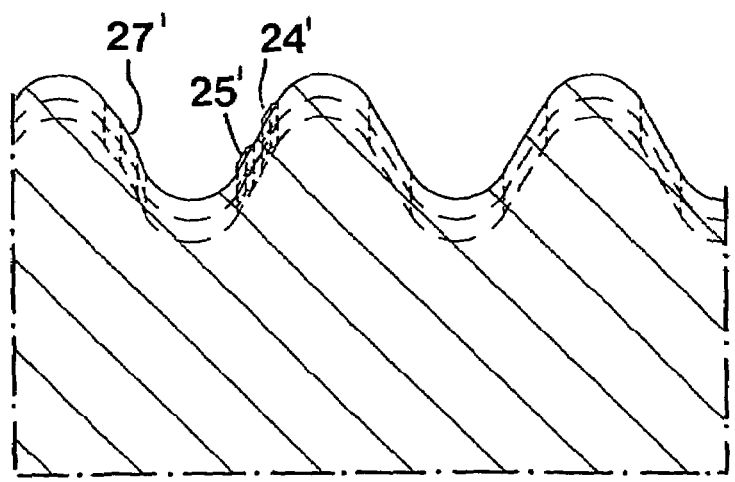
FIG. 9 is a cross-section corresponding to FIG. 7 showing an alternative embodiment of a serration connecting surface.
Figure 10:
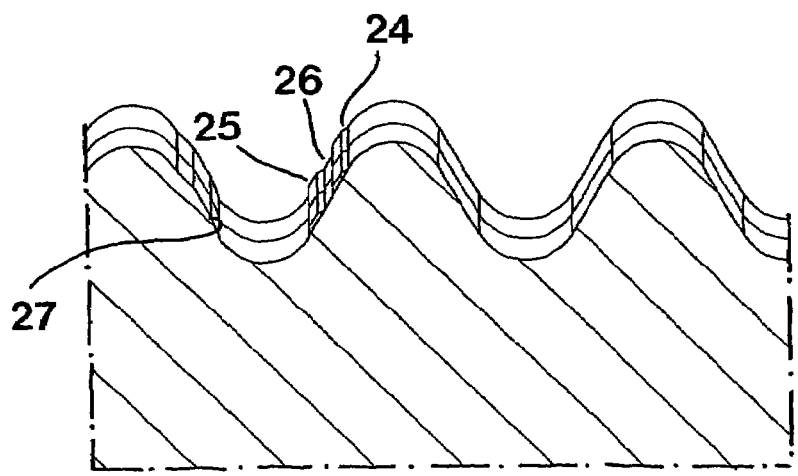
FIG. 10 is a cross-section corresponding to FIG. 8 showing the embodiment according to FIG. 9.

Reference is now made to FIGS. 9 and 10, which illustrate how the flanks adjacent to an individual groove may be formed in another way than with smooth contact supporting surfaces. Thus, the flank on one (right) side of the groove is formed with two laterally spaced apart bulges 24, 25 (i.e. spaced apart along the height of the flank), between which there is a valley 26. In the sections C, planar outsides 24', 25' on the bulges form contact supporting surfaces (contact surfaces), which are spaced apart laterally by means of the valley 26 forming a clearance surface. Thus, each of the axially spaced contact surfaces 18a of the respective flank is divided into two contact surface portions defined by the bulges 24', 25' that are spaced along the height of the flank. The flank on the opposite side of the groove is formed with a longitudinal protrusion 27, having a planar, intermediate contact supporting surface 27', which is thinner in the lateral (peak-to-bottom) direction than the corresponding flank surfaces on the previously described embodiment. Thus, in the embodiment shown in FIGS. 9 and 10, a three-point abutment against the surfaces 24', 25' and 27' is obtained in each individual section C when a ridge of a cooperating serration connecting surface is brought to engagement with the groove. No contact occurs along the sections D, consistent with the previously described embodiment.

The embodiment according to FIGS. 9 and 10 may advantageously be applied to the cutting inserts of the cutting insert (in connection with compression molding of the same), but may also be present in a serration connecting surface serving as insert seat.

Advantages of the Invention

By forming, in accordance with the invention, one of the two serration connecting surfaces with axially alternating contact supporting surfaces and clearance surfaces, minor shape defects of the type that at times may arise in connection with the manufacture are compensated for. In particular, shape defects in connection with the production of cutting inserts may be compensated for by the fact that the serration connecting surface, which serves as insert seat, is formed with clearance surfaces in the flanks of the ridges. The design according to the invention becomes particularly advantageous if the clearance surfaces are made longer than the contact supporting surfaces, such as has been described above. Because actual contact between two cooperating connecting surfaces is established solely along the contact supporting surfaces, but not along the clearance surfaces, a stable and geometrically well-defined engagement is guaranteed between the ridges in the respective connecting surfaces.

Feasible Modifications of the Invention

The invention is not limited only to the embodiment described above and shown in the drawings. Instead of the insert seat 3 being formed with ridges having spaced contact surfaces, the cutting insert 2 could be provided with such ridges. The clearance surfaces may be provided in a way other than by means of a milling cutter of the type that has been exemplified in FIGS. 5 and 6. For instance, individual clearance surfaces may be formed by grinding, spark machining and/or compression molding of the material in the tool part in question. In this connection, it should be pointed out that the invention is not limited to the design of clearance surfaces in an insert seat in a basic body made from steel or the like. Thus, connecting surfaces, which are found in cutting inserts of cemented carbide and/or shim plates of steel or cemented carbide, may also be formed with clearance surfaces of the type described herein.

Furthermore, it is feasible to form only one of the two flanks adjacent to the individual groove with one or more (axially spaced apart) clearance surfaces, while the opposite flank in its entirety forms a contact supporting surface.

In the first described embodiment of FIGS. 3-8, the bottom of the groove is made slightly arched along section D, more precisely by the fact that a milling cutter during the passage thereof along the individual section D is gradually lowered down to a deepest point, from which the milling cutter again is gradually lifted (compare the arched path H). Within the scope of the invention, it is of course also possible to bring down the milling cutter in the surface material of the tool part fairly steep (e.g., at a 90° angle), and then lift the milling cutter equally steep, when the same has passed the surface section in question to thereby eliminate the arching along the section D.

Within the scope of the invention, it is also feasible to form clearance surfaces without the crests of the ridges nor the bottoms of the grooves being given arc-shape or otherwise countersunk. In this case, the necessary lateral widening of the groove is carried out solely in the respective flank surfaces.

Although the contact supporting surfaces shown in the drawings are planar, they may also have another shape. For instance, they may be convexly curved.

In conclusion, it should be emphasized that the invention also is applicable to serration connecting surfaces, the ridges arid grooves of which do not have a straight shape, as in the embodiment example. Thus, serration connecting surfaces, the ridges and grooves of which are curved (e.g. having circular lengths) in the way described in WO 03/080280, may also be formed with alternating contact supporting surfaces and clearance surfaces in accordance with the invention.

What is claimed is:

1. A culling tool comprising first and second parts interconnected by respective connecting surfaces, each connecting surface comprising a serrated connecting surface having alternating ridges and grooves, said ridges being formed by the convergence of adjacent flanks, each groove formed by adjacent flanks of respective adjacent ridges, and each said ridge decreasing in width as it extends away from said groove, each flank thereby defining a plane, at least one of said flanks forming said groove in the first part including a plurality of contact surfaces located in a common flank plane spaced apart by a clearance surface located in said flank plane wherein a ridge of the second part is in contact with the plurality of contact surfaces and out of contact with the clearance surface.

2. The cuffing tool according to claim 1 wherein the contact surfaces are flat and coplanar.

3. The cuffing tool according to claim 1, wherein the ridge forming the at least one groove flank has a varying width, wherein the width is greater along each contact surface than along the clearance surface.

4. The culling tool according to claim 1 wherein the at least one groove flank comprises both flanks of the groove.

5. The culling tool according to claim 1 wherein each ridge forms a ridge crest, and each groove forms a groove bottom; the portions of the ridge crest located along the sections of the ridge forming the contact surfaces lie in a common first plane; the portions of the groove bottom located along the sections of the ridge forming the contact surfaces lying in a common second plane parallel to the first plane; the portions of the groove bottom located along the section of the ridge forming the clearance surface extending deeper than the second plane.

6. The cutting tool according to claim 5 wherein a portion of the groove bottom located along the section of the ridge forming the clearance surface is concavely arched so as to be deepest at a location substantially midway between adjacent contact surfaces.

7. The cuffing tool according to claim 1 wherein each contact surface is shorter than the clearance surface along the groove length.

8. The cutting tool according to claim 1 wherein the ridges and the grooves are straight along their length.

9. The cutting tool according to claim 1 wherein each contact surface includes contact surface portions spaced apart along a height of the flank.

10. The cutting tool according to claim 1 wherein the contact surfaces are spaced apart along a height of the flank.

11. An insert seat adapted to receive a cuffing insert, comprising a serrated connecting surface having alternating ridges and grooves, said ridges being formed by the convergence of adjacent flanks, each groove formed by adjacent flanks of respective adjacent ridges, and each said ridge decreasing in width as it extends away from said groove, each flank thereby defining a plane, at least one of said flanks forming said groove including a plurality of contact surfaces located in a common flank plane and spaced apart by a clearance surface located in said flank plane.

12. The insert seat according to claim 10 wherein the clearance surface being recessed relative to the contact surfaces in a direction away from an opposite flank of the groove.

13. The insert seat according to claim 12 wherein each contact surface includes contact surface portions spaced apart along a height of the flank.

14. The insert seat according to claim 11 wherein the contact surfaces are spaced apart along a height of the flank.

15. A cutting insert comprising a serrated connecting surface having alternating ridges and grooves, said ridges being formed by the convergence of adjacent flanks, each groove formed by adjacent flanks of respective adjacent ridges, and each said ridge decreasing in width as it extends away from said groove, each flank thereby defining a plane, at least one of said flanks forming said groove including a plurality of contact surfaces located in a common flank plane and spaced apart by a clearance surface located in said flank plane.

16. The cutting insert according to claim 15 wherein the clearance surface being recessed relative to the contact surfaces in a direction away from an opposite flank of the groove.

17. The cutting insert according to claim 16 wherein each contact surface includes contact surface portions spaced apart along a height of the flank.

18. The cutting insert according to claim 15 wherein the contact surfaces are spaced apart along a height of the flank.

19. A method for forming, in a workpiece, a serrated surface comprised of alternating ridges and grooves, each groove formed by two flanks of respective adjacent ridges and having a generally V-shaped cross-sectional shape becoming narrower toward a bottom of the groove, the method comprising:

A. advancing a generally V-shaped cuffing tool though the workpiece at a first height for a first distance of advancement, B. displacing the cuffing tool deeper into the workpiece for a second distance of advancement, and C. returning the cuffing tool of the first height for a third distance of advancement;

wherein a section of at least one of the flanks formed during advancement of the workpiece along the second distance is recessed with respect to the sections of such flank formed during advancement of the workpiece along the first and second distances, wherein the recessing is in a direction away from the opposite groove flank.

* * * * *